July 10, 1962 D. A. BRISTOL 3,043,579
PIVOTALLY MOUNTED APPARATUS
Filed Jan. 5, 1960 3 Sheets-Sheet 1

INVENTOR.
DAVID A. BRISTOL
BY Mason, Kolehmainen, Rathburn and Wyss
ATTORNEYS.

July 10, 1962 D. A. BRISTOL 3,043,579
PIVOTALLY MOUNTED APPARATUS
Filed Jan. 5, 1960 3 Sheets-Sheet 2
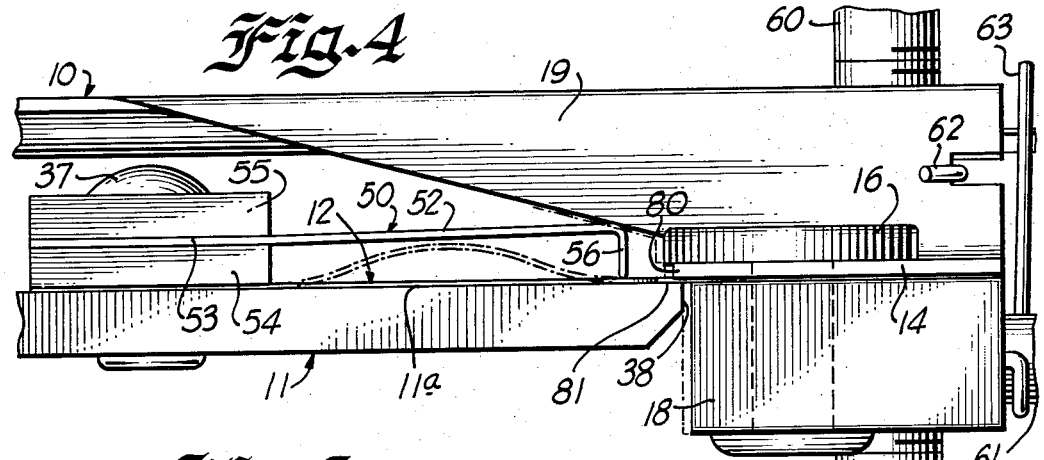
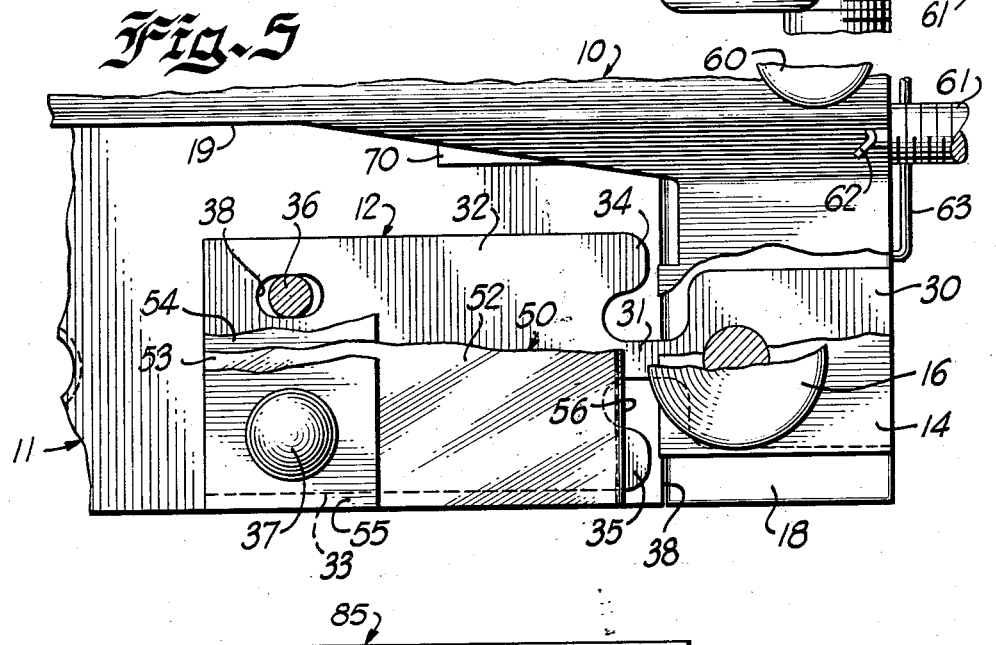
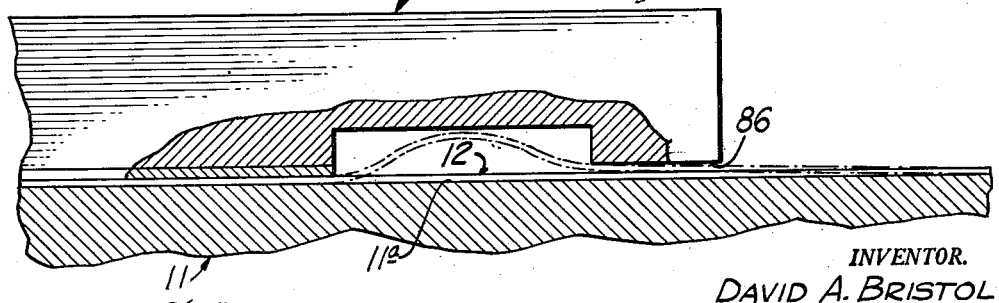
INVENTOR.
DAVID A. BRISTOL
BY
Mason, Kolehmainen, Rathburn and Wyss
ATTORNEYS.

July 10, 1962     D. A. BRISTOL     3,043,579
PIVOTALLY MOUNTED APPARATUS
Filed Jan. 5, 1960     3 Sheets-Sheet 3
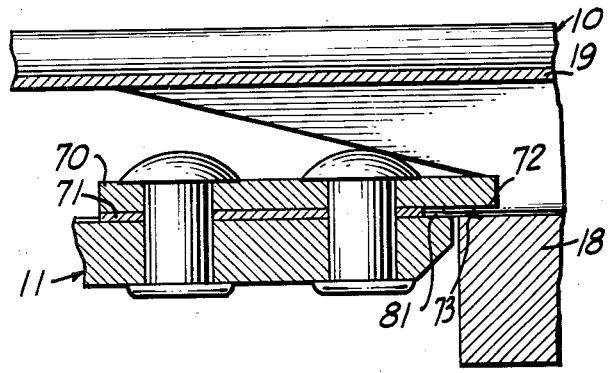
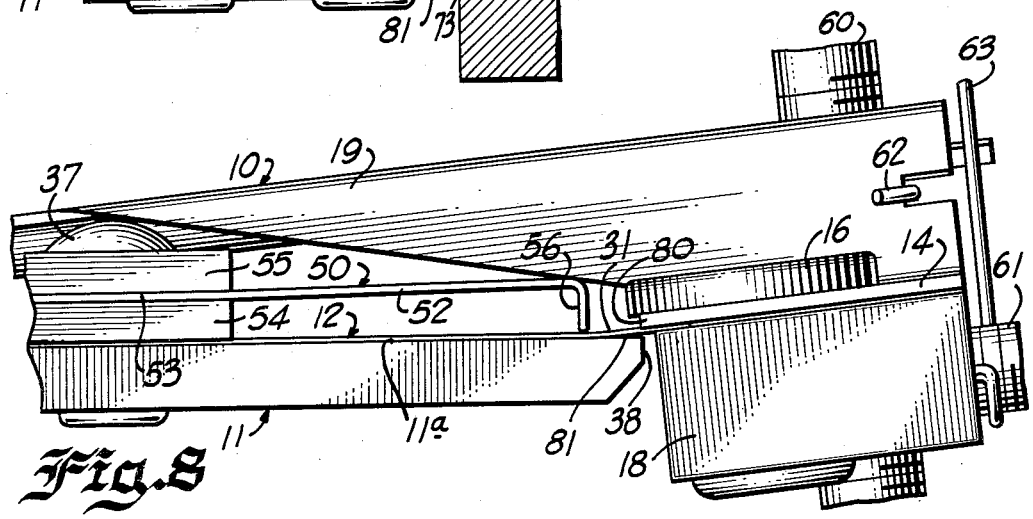
INVENTOR.
DAVID A. BRISTOL
BY
Mason, Kolehmainen, Rathburn and Wyss
ATTORNEYS.

3,043,579
PIVOTALLY MOUNTED APPARATUS
David A. Bristol, Middlebury, Conn., assignor, by mesne assignments, to Robertshaw-Fulton Controls Company, Richmond, Va., a corporation of Delaware
Filed Jan. 5, 1960, Ser. No. 541
7 Claims. (Cl. 267—1)

The present invention relates to pivotally mounted apparatus, and more particularly to a flexure mounting arrangement for a pivotal beam structure of the type which may, for example, be used in an electromechanical balance unit. One such unit is described in U.S. Patent 2,913,672, isued November 17, 1959, to Edgar S. Gilchrist and Arthur J. Sable, and assigned the same assignee as the present invention.

Such electromechanical balance units contain a deflectable balance beam which is mounted for pivotal movement. The movement of the beam is quite small, and the beam must be readily movable through its operating range with a small force. It has been customary heretofore to mount such beams for pivotal movement through a flexure element. However, difficulty has been experienced in such delicate beam mountings in that they have not possessed the desired ability to withstand shock, e.g., to withstand nonuniformly or rapidly applied load to the mounting arrangement. It is, therefore, an object of the present invention to provide a new and improved pivotally mounted apparatus which has increased ability to absorb shock and related loads.

Another object of the present invention is to provide a new and improved mounting arrangement for a balance beam.

A further object of the present invention is to provide a new and improved mounting arrangement for the deflectable beam of an electromechanical balance unit.

A still further object of the present invention is to provide a new and improved flexure mounting element for the pivotal mounting of a deflectable balance beam.

The foregoing and other objects are realized in accordance with the invention by providing an improved flexure mounting means interconnecting the pivotal member and a support member thereby permitting pivotal motion of the members relative to each other through flexure of the mounting means. The flexure mounting means includes at least one thin flat resilient element having one end secured to the support member and having the other end overlying an edge of the support member and secured to the pivotal member. The flexure element permits pivotal movement of the members due to flexure of a portion of the element. The end of the flexure element secured to the support member is secured at a point sufficiently removed from the edge of the support member to permit the element to bend laterally in column action when the pivotal member is moved toward this support during the application of the aforementioned shock loads in a direction to produce axial compressive stresses in the element. The resiliency of the flexure element returns it as well as the pivotal member to their original position upon removal of the load. The pivotal member and support member contain cooperating limit stops for limiting the relative movement of the pivotal member and the support member, thereby preventing the column bending stresses of the elements from exceeding the elastic limit thereof. According to one preferred embodiment, a retainer, which may be a preloaded spring, biases the flexure element against the support intermediate the element to divide the element into a flexure portion and a column portion and further assuring that the pivot point of the pivotal member does not move along the element, but remains fixed in the flexure portion between the retainer and the pivotal member. A preferred resilient flexure element includes a short narrow flexure portion extending between the retainer and the pivotal member, and a wider column portion of sufficient length to permit column action to result and of sufficient width to provide a rigid attachment of the flexure portion to the support member when column action is absent.

The invention, both as to its organization and method of operation, together with further objects and advantages thereof, will best be understood by reference to the following description taken in connection with the accompanying drawings, in which:

FIG. 4 is an enlarged front view of the flexure element illustrating the column action thereof;

FIG. 5 is an enlarged top view of a preferred flexure element according to the present invention;

FIG. 6 is a partial sectional view illustrating one of the limit stops;

FIG. 7 is an enlarged front view illustrating another embodiment of the instant invention;

FIG. 8 is a partial enlarged side view illustrating the deflection of the pivotal member; and FIG. 9 is a curve relating the lateral and axial deflections of the column portion of the flexure element.

Figure 1:
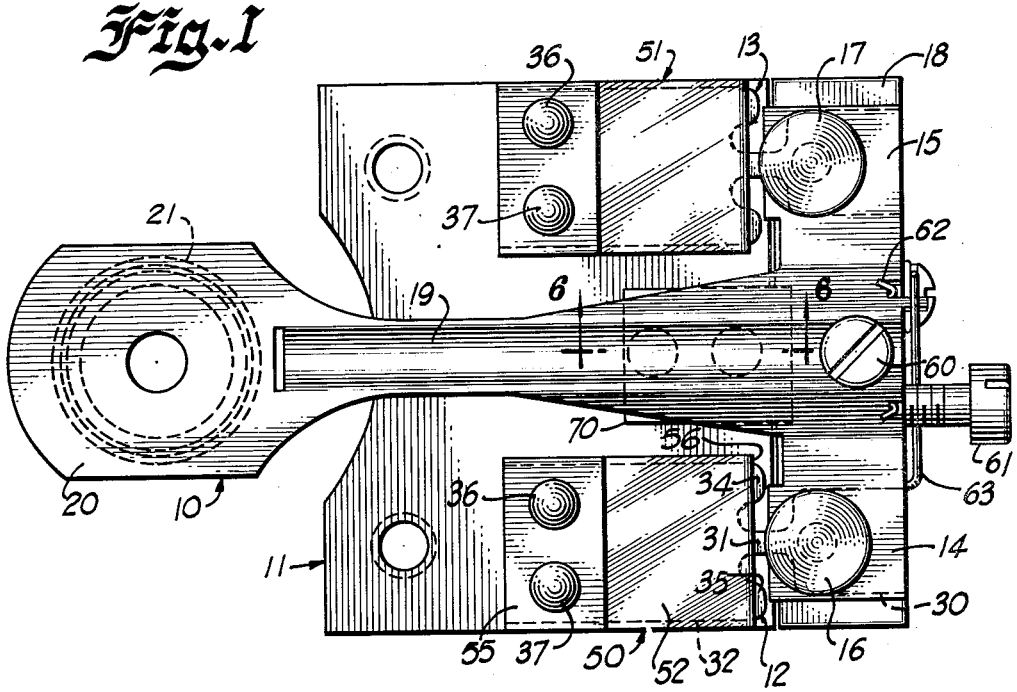
FIG. 1 is a plan view illustrating the improved pivotally mounted apparatus according to the instant invention.
Figure 2:
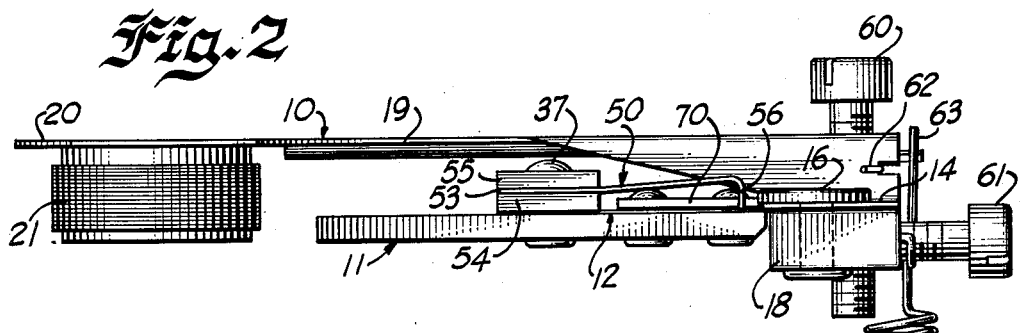
FIG. 2 is a front view of the improved apparatus according to the instant invention.
Figure 3:
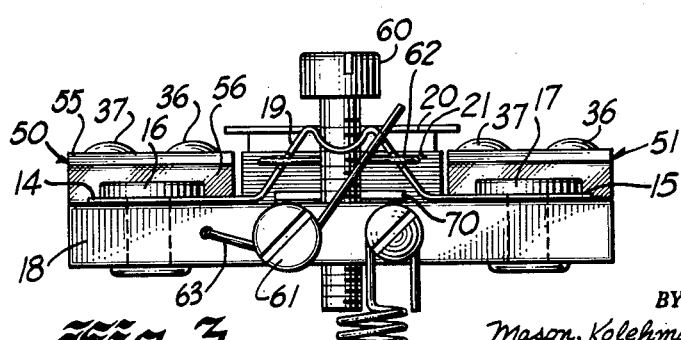
FIG. 3 is a side view of the improved apparatus according to the instant invention.

Referring now to the drawings, there is illustrated a pivotal member or deflectable beam 10 pivotally secured to a stationary support member 11 by a pair of resilient flexure elements 12 and 13.

The beam 10 is provided at one end with a pair of horizontal mounting flanges 14 and 15, which are secured to the flexure elements 12 and 13 by means of a pair of large-headed rivets 16 and 17 extending respectively through the horizontal flanges 14 and 15, the flexure elements 12 and 13, and a solid bar counterweight member 18. The intermediate portion of the beam 10 is provided with a troughlike portion 19 for increased rigidity of the beam and the beam 10 is further provided at the other end with a flat, enlarged end portion 20. The enlarged end portion 20 may, if desired, contain a winding 21 which, together with appropriate magnetic structure, forms an electromagnet, and which is more fully described in the aforementioned patent to Gilchrist et al.

As best seen in FIG. 5, each flexure element 12, 13 includes an outer flange portion 30 secured to the deflectable beam 10 through rivet 16, as hereinbefore described; the outer flange portion 30 connects to a relatively short narrow flexure portion 31 joining a relatively long, wide column portion 32 which terminates at its other end in a mounting portion 33. The column portion 32 has a pair of tabs 34 and 35 extending from its corners longitudinally in the direction of the flexure portion 31 and parallel to the axis thereof. The flexure elements 12, 13 are each secured to the support member 11 by a pair of rivets 36, 37 such that the outer flange portion 30 and a part of the flexure portion 31 overhang an edge 38 of the stationary support member 11 sufficiently far so that the solid bar member 18 (FIGS. 4, 5 and 8) secured to the outer flange portion 30 thereof forms a predetermined clearance with the edge 38. In order that the clearance may readily be held, the rivets 36, 37 fit through slots 38 (FIG. 5) in the mounting portion 33 of the flexure elements 12 and 13, thereby permitting longitudinal adjustment between the elements and the support members 11 during assembly thereof.

The flexure elements 12 and 13 have their flexure portions 31 and tabs 34 and 35 held firmly against the support member 11. As illustrated in the embodiment of FIGS. 1 to 5 and 8, this is accomplished by means of a pair of preloaded spring retainers 50 and 51 associated with the elements 12 and 13 respectively. Each preloaded spring retainer 50 and 51 is formed of a thin flat relatively wide spring sheet having a body portion 52, one end 53 of which is secured in spaced relation to the mounting portion 33 of the flexure elements 12 and 13 by means of a pair of solid bar spacers 54, 55. At the other end of the body portion 52 is a pressure portion 56 formed of a portion of the sheet bent at right angles from the body portion 52 toward the flexure elements 12 and 13 and biasing the flexure elements 12 and against the stationary support member 11. The pressure portion 56, in the preferred embodiment, is biased against the tabs 34 and 35 and the flexure portion 31 and contacts the flexure portion 31 at its end adjacent to the column portion 32 of the flexure element.

In order to balance the beam 10 statically, there is provided a large-headed screw 60 which extends vertically through a clearance opening in the beam 10 and threads into an opening in the solid bar member 18. A similar screw 61 is threaded horizontally, parallel to the longitudinal axis of the beam 10, through another aperture in the solid bar member 18 parallel to the longitudinal axis of the beam to provide for static adjustment of the beam 10 in the other axis. After the screws 60 and 61 have been adjusted to attain static balance of the beam 10, these screws are held in place by means of the spring wire retainers 62 and 63, which engage the threads of the screws 60 and 61 respectively, and exert a side thrust thereon to secure the same in their adjusted position. The beam 10 and counterweight member 18 are preferably of aluminum so as to have the same characteristics. It will be noted that the member 18 and the screws 60 and 61 are all mounted very close to the pivotal axis of the beam 10 so that rotational inertia effects, which vary in proportion to the square of the distance from the pivotal axis, are substantially reduced. Moreover, the inertia effects of the beam 10 are reduced by the use of an aluminum beam.

The beam 10 is pivotally deflectable with attendant bending of the flexure elements 12 and 13 at the flexure portion 31 upwardly and outwardly of the retainers 50 and 51 as best illustrated in FIG. 8. Moreover, column action in the column portions of the flexure elements 12 and 13, along with a plurality of stop means, prevents buckling or stressing of the column portions of the flexure elements 12 and 13 beyond their elastic limit. The column action thereby saves the flexure portion from damage while stop means, hereinafter described, save the column portion from damage; that is, from exceeding their elastic limit. To provide for longitudinal movement of the beam 10 with reference to its longitudinal axis, the flexure elements 12 and 13 will bend in column action, as best illustrated in FIG. 4. When subjected to a compressive load, the resilient column portions 32 will act substantially as long columns, one end of which is fixedly held between the solid bar spacer 54 and the support member 11, and the other end of which is slidably held by the pressure portion 56 of the preloaded spring retainer 50. The tabs 34 and 35 and the flexure portion 31 are held firmly against the support member 11 by the pressure portion 56 so that the curve of the long column meets the support member substantially tangentially and produces a bending moment in this end of the column portion 32 to cause the column portion 32 to buckle as a long column with both ends effectively fixed. As is well known, the critical buckling load is inversely proportional to the square of the length of the column, so that where the length is relatively large the column portions 32 of the flexure elements 12 and 13, which normally rest against a surface 11a of the support member, will readily bend laterally in column action.

In order to prevent loading the flexure elements 12 and 13 in column action beyond their elastic limit, a first limit stop is provided by the clearance between edge 38 of support member 11 and the solid bar member 18 which is secured to the outer flange portion 30 of the flexure elements 12 and 13 at a predetermined clearance of, for example, .005 inch. The flexure elements 12 and 13 cannot be compressed axially more than this predetermined clearance, thereby restricting the compressive movement of the flexure elements 12 and 13. The column stress in the flexure elements 12 and 13 is a function of the axial deflection of the column and the length of the column portion 32. Moreover, the axial deflection of the column portion is related to the lateral deflection of the column, as illustrated by the empirically derived curve of FIG. 9. This lateral deflection (X) may be represented by the equation:

$$X = \frac{l^2 s}{10 E h}$$

where $l$ is the length of the column portion, $s$ is the allowable stress, and $h$ is the thickness of the column portion. It has been found that a satisfactory column portion may have a length of 0.3 in. and width of 0.375 in., with a thickness of .002 in.; which, for a maximum lateral displacement of .024 in., would result in an axial deflection of .005 in., as determined from the curve of FIG. 9. The body portion 52 of the retainers 50 and 51 thus has a sufficient clearance with respect to the surface 11a to permit the necessary lateral deflection of the flexure elements 12 and 13 therein, as illustrated in phantom in FIG. 4.

Any loading which tends to move the beam 10 longitudinally in a direction to tension the flexure elements 12 and 13 does not present a serious stress problem as the elements 12 and 13 are normally adequately strong in tension to withstand expected tensile loads.

Stop means also prevent the beam 10 from moving in a vertical direction beyond predetermined limits. The beam 10 can move vertically only through a predetermined distance due to the provision of a vertical stop member 70 (FIG. 6) secured in spaced relation to the stationary support member 11 by a spacer member 71 and located between the two mounting elements 12 and 13 so as not to interfere therewith. The lower outer edge 72 of the stop member 70 is spaced vertically above the normal position of the upper edge 73 of the solid bar member 18 to thereby act as a limit stop. The maximum upward movement of member 18 is determined by the clearance between the lower outer edge 72 of the vertical stop member 70 and the upper edge 73 of the bar 18. The spacer 71 may, for example, have a thickness in the range of about .004 to .005 in., thereby providing for a maximum vertical upward deflection of this amount. The beam 10 is restrained from vertically downward motion from its normal position by the interference of a lower edge 80 (FIG. 4) of the beam 10 and an upper edge portion 81 of the stationary member 11, the interference being transmitted through the flexure elements 12 and 13.

A side shock load up or down, as viewed in FIG. 1, also tends to bend in column action the elements 12 and 13; one side of the column portion tending to raise up more than the other side. As is well known, such shock loads have a given amount of energy to be dissipated and, while it can be partially absorbed in spring energy in the column portions of the resilient flexure elements 12 and 13, a snubbing action also occurs and the energy is in part consumed in friction, due to the small clearance for longitudinal movement of the beam afforded between the solid bar member 18 and the edge 38 of the stationary support member 11.

The flexure elements 12 and 13, having a narrow flexure portion 31 and a relatively wider column portion 32, have several advantages over a flexure element of constant width. A flexure element of constant width could, of course, have the same buckling action as described above, but would result either in a much stiffer resilient mounting (or flexure portion 31) and the beam 10 would not under these conditions have the necessary deflection sensitivity; or would result in a much less rigid column portion 32 and the beam would lack adequate support in the absence of column action.

It is necessary that the buckling of the flexure elements be confined to the column portion 32 and that the flexure portion 31 not buckle in column action. The retainers 50 and 51 therefore bear against a part of the flexure portion 31 and the tabs 34 and 35 extending from the edge of the column portion 32, thereby defining an approximately rectangular column portion 32 and a generally rectangular flexure portion 31. Since the length of the flexure portion 31 is so small compared to the length of the column portion, the flexure portion 31 will not act as a long column and will, therefore, not buckle under a compressive column load. In this respect, the flexure portion 31 acts merely to transmit compressive column loads to the column portion 32. As heretofore described, the column is one having fixed ends and extending from the pressure portion 56 of the retainers 50 and 51 to the solid bar spacers 54 and 55. The retainers 50 and 51 bear against the flexure elements 12 and 13 with sufficient force to prevent the mounting elements from raising off the stationary support member 11 at the pressure portion 56. It will thus be seen that the retainers 50 and 51 produce a bending moment at one end of the column portion 32 by holding the flexure portion 31 and tabs 34 and 35 flat against the surface 11a. As a result, the column portion acts substantially as a long column with its ends fixed. The pressure of the pressure portion 56 against the flexure portion 31 establishes or controls the location of the pivot point. The pressure portion 56 does not, however, bear against the flexure elements 12 and 13 with sufficient force to prevent longitudinal movement of the flexure portion 31 due to friction between the pressure portion 56, the flexure elements and the surface 11a, nor can the friction be so great as to prevent the return of the flexure portion upon release of the column buckling load.

An alternate form of retainer is illustrated in FIG. 7. The flexure elements, such as the element 12 described above, are held against the surface 11a of the stationary member 11 by a rigid retainer 85. The retainer 85 has a guide portion 86 unyieldingly spaced closely above the inner end of the flexure portion 31 and the tabs 34 and 35 of the flexure element 12, thereby permitting axial movement of the flexure portion while retaining the contacted part of the flexure element 12 closely adjacent the stationary support member 11. As shown, the guide portion 86 comprises a flat surface. Due to the bending moment introduced to the column portion 32 through the flexure portion 31 and tabs 34 and 35 the flexure element 12 acts as a column fixedly secured at its mounting portion 33 and the guide portion 86. The action of the flexure mounting element 12 under compressive load is the same as that described above.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. Pivotally mounted apparatus including a support member, a pivotal member, and at least one thin flat resilient flexure mounting element interconnecting said support member and said pivotal member while permitting pivotal movement thereof relative to each other, said element at least partially overlying said support member with opposite ends of said element fixedly secured to said support member and said pivotal member respectively, and a retainer holding said element at a point intermediate its ends while permitting longitudinal movement of said intermediate point of said element relative to said support member, said flexure element being so proportioned that the portion of said element between said intermediate point and the end of said element which is secured to said support member buckles in column action upon longitudinal movement of said pivotal member toward said support member.

2. A pivotally mounted apparatus according to claim 1 above and additionally including cooperating limit stop means for limiting said longitudinal movement of said pivotal member so that buckling of said element in column action does not exceed the elastic limit of said flexure element.

3. Pivotally mounted apparatus according to claim 1 above wherein said retainer is a preloaded spring having a pressure portion bearing against and biasing said intermediate point of said element against said support member.

4. A pivotally mounted apparatus according to claim 1 above wherein said retainer includes a flat plane surface fixedly positioned above said intermediate point.

5. Pivotally mounted apparatus including a support member, a deflectable beam, at least one thin flat resilient flexure mounting element interconnecting said member and said beam, said element including a short narrow flexure portion connected to a wider, longer column portion of sufficient length to permit long column buckling action to occur, said flexure portion being sufficiently resilient to permit said beam to move pivotally relative to said support member by bending of said portion, said element at least partially overlying said member with its end adjacent said column portion fixedly secured to said member and its end adjacent said flexure portion fixedly secured to said beam, and a retainer holding said element against said member at a point intermediate its ends while permitting longitudinal movement of said intermediate point of said element relative to said member to permit said column portion of said element to buckle in column action upon longitudinal movement of said beam toward said member.

6. A pivotally mounted apparatus according to claim 5 above wherein said retainer holds said flexure portion of said element near its junction with said column portion against the support member.

7. Pivotally mounted apparatus including a support member, a pivotal member, at least one thin flat resilient flexure mounting element interconnecting said support member and said pivotal member, said element including a short narrow flexure portion connected to a wider longer column portion of sufficient length to permit long column action to occur, said flexure portion being sufficiently resilient to permit said pivotal member to move pivotally relative to said support member by bending of said portion, said element at least partially overlying said support member with its end adjacent said column portion fixedly secured to said support member and its end adjacent said flexure portion secured to said pivotal member, and a retainer holding said element against said support member at a point intermediate its ends while permitting longitudinal movement of said intermediate point of said element relative to said support member to permit said column portion of said element to buckle in column action upon movement of said pivotal member toward said support member, said column portion including a pair of tabs extending from its corners longitudinally in the direction of said flexure portion and parallel to the axis of said flexure portion, said retainer holding said tabs against said support member so as to transmit bending movement to said column portion when said column portion buckles under column action so that said column portion acts substantially as a long column with its ends fixed.

References Cited in the file of this patent
UNITED STATES PATENTS
1,834,461    Lea _____ Dec. 1, 1931